United States Patent [19]

Ishida

[11] 4,166,139
[45] Aug. 28, 1979

[54] METHOD OF PRODUCING INSTANT CUPPED NOODLES

[75] Inventor: Masayuki Ishida, Chigasaki, Japan

[73] Assignee: Toyo Suisan Kaisha, Ltd., Tokyo, Japan

[21] Appl. No.: 938,359

[22] Filed: Aug. 31, 1978

Related U.S. Application Data

[63] Continuation of Ser. No. 816,893, Jul. 18, 1977, abandoned.

[30] Foreign Application Priority Data

Jul. 22, 1976 [JP] Japan .................................. 51-87602

[51] Int. Cl.² .............................................. A23L 1/16
[52] U.S. Cl. ..................................... 426/394; 99/405; 99/407; 99/409; 426/115; 426/438; 426/439; 426/557
[58] Field of Search ................................ 426/438–441, 426/451, 517, 458, 457, 113, 115, 128, 106, 394, 557; 99/405, 407, 409

[56] References Cited

U.S. PATENT DOCUMENTS 3,892,874  7/1975  Ando .............................. 426/399 X
3,997,676  12/1976  Ando .............................. 426/439 X

FOREIGN PATENT DOCUMENTS 30-7193 10/1955 Japan .
39-17307 8/1964 Japan .
5796 5/1971 Philippines .

OTHER PUBLICATIONS

Food Science Article, "The Industry of Manufacturing Vermicelli in These Days—Translation—vol. 8 #89, 7/30/66.
Sogo Shokuryo Kogyo (Instant Noodle Text Publication—1970—Translation).

Primary Examiner—Steven L. Weinstein
Attorney, Agent, or Firm—Frishauf, Holtz, Goodman & Woodward

[57] ABSTRACT

A method of producing instant cupped noodles comprising disposing a mass of raw noodles in a liquid-permeable metal cup, the cup having at least a tapered wall, placing a liquid-permeable metal lid to cover the opening of the metal cup, and completely immersing the metal cup in a heated oil for frying the mass of noodles housed in the metal cup while the cup is inverted and immersed, thereby rendering the mass of noodles dense in the portion close to the bottom of the metal cup and sparse in the portion close to the metal lid. The metal cup is then taken out of the heated oil, the metal lid is removed from the metal cup for discharging the fried mass of noodles, and the discharged fried mass of noodles is dried. The dried mass of noodles is then packed, preferably together with proper condiments and ingredients, in a cup-shaped container substantially equal in shape to and slightly larger in inner diameter than the metal cup, the packing being effected such that the dense and sparse portions of the mass of noodles are disposed in lower and upper portions of the container, respectively, and the cup-shaped container is sealed. Also disclosed is apparatus for carrying out the above method.

10 Claims, 5 Drawing Figures 4,166,139

METHOD OF PRODUCING INSTANT CUPPED NOODLES

CROSS REFERENCE TO RELATED APPLICATION

This is a continuation of U.S. patent application Ser. No. 816,893, filed July 18, 1977, now abandoned.

BACKGROUND OF THE INVENTION

This invention relates to a method of producing cupped noodles which can be served after hot water has been poured thereinto.

Japanese Utility Model Publication Nos. 4088/64 and 26930/69 teach preparing instant noodles by housing a fried mass of noodles together with proper condiments and ingredients in a bowl-shaped container made of foamed synthetic resin. These prior art processes are defective in that the mass of noodles tends to be broken into pieces at least partially because it is moved within the container by vibration during transport, or the like.

Japanese Patent Publication No. 38693/75 discloses a method of producing instant noodles, which is intended to remove the above-noted difficulty. In addition, the method disclosed is effective for preventing the condiments and ingredients from moving downward through the clearance between the mass of fried noodles and the inner wall of the container. The method of this Japanese patent publication comprises the steps of disposing a mass of raw noodles in a metal cup, placing a metal lid to cover the opening of the metal cup, immersing the metal cup in a frying oil, taking the fried mass of noodles from the metal cup, drying the fried mass of noodles, packing the dried mass of noodles together with proper condiments and ingredients in a cup-shaped container substantially equal in shape to and slightly larger in inner diameter than the metal cup, and sealing the container. In this case, the metal cup housing the mass of raw noodles is immersed upright in the frying oil, namely, immersed such that the metal lid is positioned at the upper end of the metal cup, resulting in that the fried mass of noodles is rendered sparse in the portion close to the bottom of the metal cup and dense in the portion close to the metal lid. Further, the fried mass of noodles is packed in the cup-shaped container such that the dense and sparse portions are disposed in upper and lower portions of the container, respectively. This gives rise to the drawbacks that the sparse lower portion of the mass of noodles is weak against shocks applied from below the container and that the dense upper portion renders it somewhat difficult for hot water to flow downward rapidly.

SUMMARY OF THE INVENTION

An object of this invention is to provide a method of producing instant noodles packed in a cup-shaped container such that dense and sparse portions of the mass of noodles are disposed in lower and upper portions of the container, respectively.

Another object is to provide instant noodles packed in a cup-shaped container such that hot water poured into the container in the preparation stage rapidly flows through the mass of noodles.

Still another object is to provide instant noodles packed in a cup-shaped container in a manner to exhibit a strong resistance against shocks applied from below the cup-shaped container.

The method of producing instant cupped noodles according to this invention comprises the steps of disposing a mass of noodles in a liquid-passing metal cup; placing a liquid-passing metal lid to cover the opening of the metal cup; completely immersing the metal cup in its inverted state in a heated oil for frying the mass of noodles housed in the metal cup while the cup is inverted and immersed, thereby rendering the mass of noodles dense in the portion close to the bottom of the metal cup and sparse in the portion close to the metal lid; taking the metal cup out of the heated oil; removing the metal lid from the metal cup for discharging the fried mass of noodles; drying the fried mass of noodles discharged from the metal cup; packing the dried mass of noodles in a cup-shaped container substantially equal in shape to and slightly larger in inner diameter than the metal cup, the packing being effected such that the dense and sparse portions of the mass of noodles are disposed in lower and upper portions of the container, respectively; and sealing the cup-shaped container.

DETAILED DESCRIPTION OF THE PREFERRED EMBODIMENTS

Figure 1:
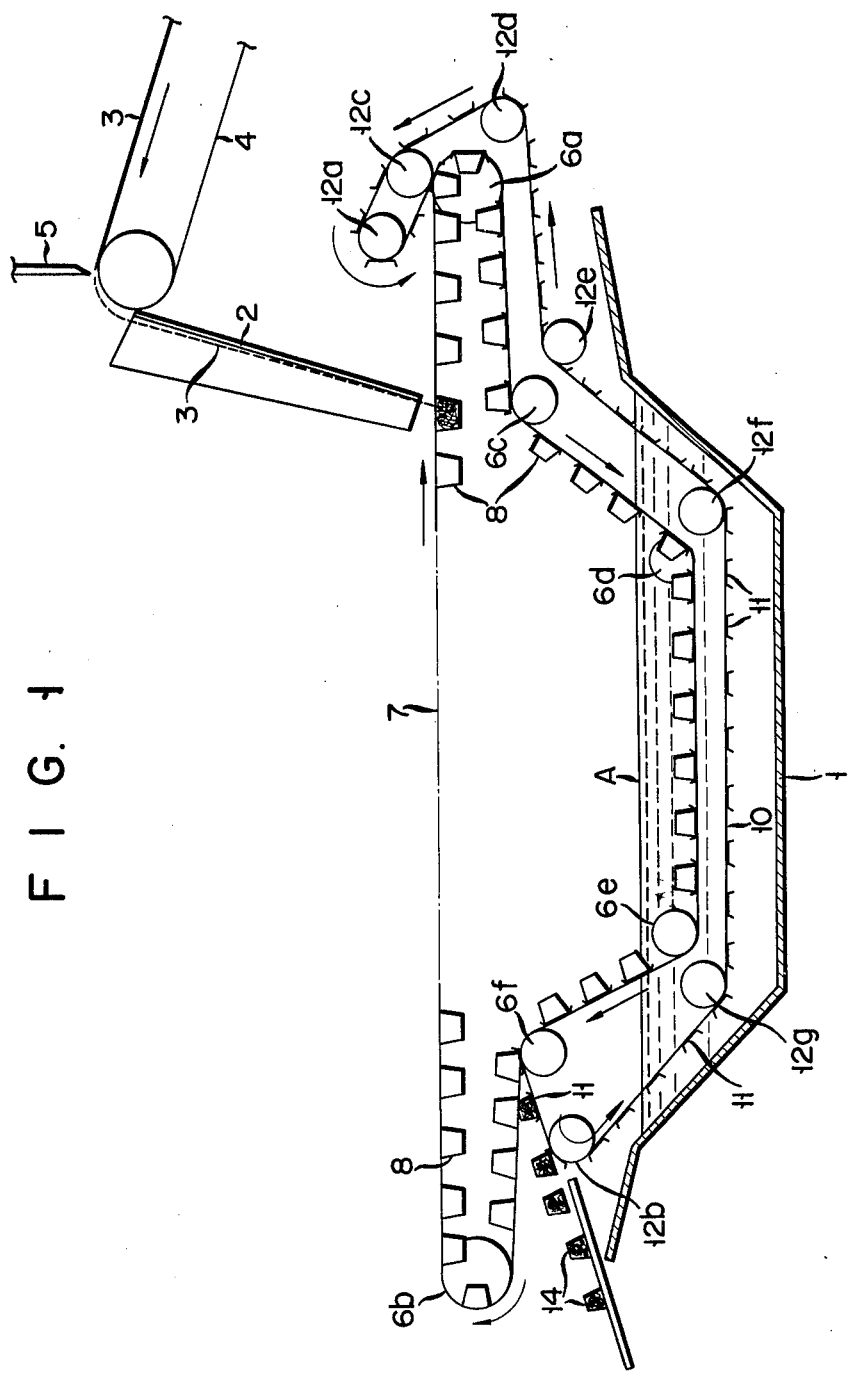
FIG. 1 shows the construction of an apparatus for frying a mass of raw noodles, according to one embodiment of this invention.

FIG. 1 shows an apparatus for frying the raw noodles according to one embodiment of this invention. In the drawing, reference numeral 1 denotes a vessel housing frying oil. Long strips of raw noodles 3 are transferred by a conveyor belt 4, cut by a cutter 5 and, then, supplied through a chute 2 to metal cups 8 mounted between two chain belts 7 stretched in parallel between driving wheels 6a and 6b. In order to enable the chain belts 7 to circulate through the vessel 1 filled with frying oil, guide wheels 6c to 6f are further provided. It is seen that the chain belts 7 are allowed to travel below the surface A of the frying oil by these guide wheels 6c to 6f when the belts 7 run from the driving wheel 6a toward the driving wheel 6b.

Figure 2:
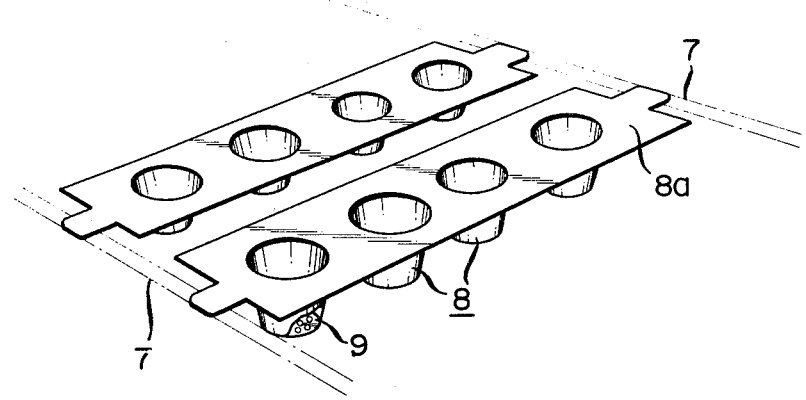
FIG. 2 is a perspective view of metal cups attached to the apparatus of FIG. 1.

The metal cups 8 mounted between two parallel-arranged chain belts 7 are fabricated by pressing a stainless steel plate 8a as shown in FIG. 2. It is preferred that the frying oil freely pass through the metal cups. To this end, a number of small holes 9 are bored through the bottom of each of the metal cups 8.

Along the chain belts 7, two additional chain belts 10 are stretched in parallel for mounting a number of metal lids 11 therebetween. FIG. 1 shows that the chain belts 10 are stretched between driving wheels 12a and 12b and guided by guide wheels 12c to 12g to run just beneath the chain belts 7 except the section between the driving wheel 12a and the guide wheel 12c within which the belts 10 run above the belts 7.

Figure 3:
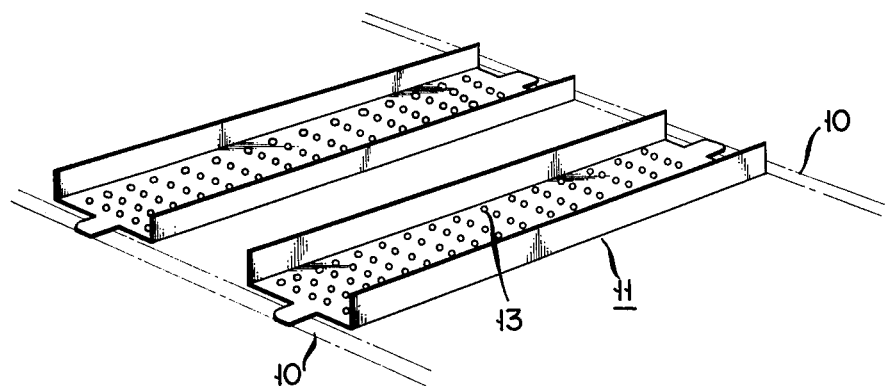
FIG. 3 is a perspective view of metal lids attached to the apparatus of FIG. 1.

The metal lids 11 mounted between the two parallel-arranged chain belts 10 are used for closing the openings of the metal cups 8 and are fabricated by, for example, folding shallow the edge portions of a stainless steel plate as shown in FIG. 3. As is the case with the metal cup 8, the metal lid 11 is preferred to pass freely the frying oil. To this end, a number of small holes 13 are bored through the bottom of the metal lid 11.

Before the frying step is carried out by using the apparatus of FIG. 1, dough is prepared first in a kneading step, followed by cutting the dough into long strips and a subsequent step of steaming the strips of the dough so as to prepare the raw noodles. The raw noodles thus prepared are transferred by the conveyor belt 4 and cut by the cutter 5 in a predetermined amount. The chain belts 7 are intermittently run in the direction shown by arrows. When the metal cup 8 is transferred by the belt 7 to be disposed just below the chute 2, the mass of raw noodles cut off by the cutter 5 is thrown through the chute 2 into the metal cup 8. The mass of raw noodles 3 thus housed in the metal cup is intermittently transferred toward the driving wheel 6a.

The chain belts 10 are also run intermittently in the direction shown by arrows at the same speed as the belts 7. The metal lid 11 mounted on the belts 10 is placed over the opening of the metal cup 8 in passing through the clearance between the driving wheel 6a and the guide wheel 12c. As seen in FIG. 1, the metal cup housing the mass of raw noodles 3 and having the opening closed by the metal lid 11 is inverted after passing through the driving wheel 6a and transferred in the inverted state to pass under the surface A of the frying oil heated to a predetermined temperature. In general, the frying treatment is applied for 2 to 3 minutes if the frying oil is kept at 130° to 150° C.

In the frying stage, the water contained in the raw noodles 3 and the oil repel each other to evaporate the water, resulting in that the mass of noodles is caused to float and be attached tightly to the bottom of the inverted metal cup. As described previously, the bottoms of both the metal cup and the metal lid are provided with small holes 9 and 13, respectively, and thus, the frying oil is freely passed to be brought into direct contact with the noodles 3 in the frying stage.

Figure 4:
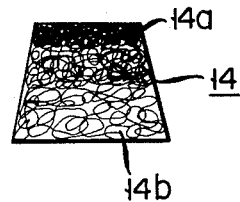
FIG. 4 is a side view of the mass of noodles fried by the apparatus of FIG. 1.

FIG. 4 shows the state of the fried mass of noodles 14. It is seen that the portion 14a close to the bottom of the metal cup 8 is dense and the opposite portion 14b, i.e., the portion close to the metal lid 11, is sparse.

The fried mass of noodles is further transferred to come out of the frying oil and to pass over the guide wheel 6f, as shown in FIG. 1. Since the chain belts 10 supporting the metal lid 11 run slightly downward after passing over the guide wheel 6f, the metal cup 8 and the metal lid 11 are separated from each other and the fried mass of noodles 14 falls from the metal cup.

Figure 5:
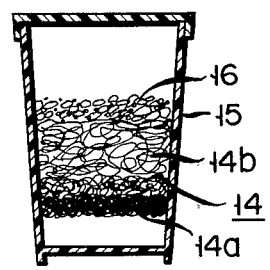
FIG. 5 is a vertical cross sectional view of the fried mass of noodles packed in a cup-shaped container.

The fried mass of noodles 14 discharged from the metal cup is subjected to drying and, then, packed together with suitable condiments and ingredients 16 in a cup-shaped container 15 (FIG. 5) substantially equal in shape to and slightly larger in inner diameter than the metal cup 8. As described previously, the packing is effected such that the dense and sparse portions of the fried mass of noodles are positioned in lower and upper portions of the container 15. Finally, the container 15 is sealed so as to provide the instant cupped noodles according to this invention.

It is important to note that the fried mass of noodles 14 is shaped to fit the inner wall of the cup-shaped container 15, resulting in that the fried mass of noodles is not moved within the container even if vibrated during the transportation. Naturally, the fried noodle is free from damage. It is also important to note that the dense portion formed in the lower portion 14a renders the fried mass of noodles 14 strong against shocks applied from below the cup-shaped container 15. An additional merit to be noted is that the upper portion 14b of the fried mass of noodles 14 is formed sparse. Thus, hot water poured in the preparation step rapidly flows downward, leading to a rapid restoration of the noodles. Further, where dried vegetables, meat and fish crushed to small pieces are used as additional ingredients, the sparse portion permits the additional ingredients to move inside the fried mass of noodles when the cupped noodles have been vibrated during the transportation. It follows that the additional ingredients are also sufficiently heated within the mass of noodles by the hot water poured in the preparation step, resulting in a rapid restoration of the additional ingredients, too.

In the embodiment described, the metal cup 8 housing the mass of raw noodles is immersed in the frying oil in the inverted state, i.e., in the state in which the metal lid 11 is positioned beneath the metal cup 8. Unlike the prior method in which a metal cup housing the mass of raw noodles is immersed upright in the frying oil, the above-noted fashion of this invention prevents the raw noodles 3 from moving outside the metal cup 8 even if there is a clearance between the metal cup 8 and the metal lid 11 or if the lid 11 has failed to just fit the opening of the cup 8. To be more specific, the raw noodles 3 are caused to move upward in the frying stage as described previously and, thus, does not move outside the metal cup.

This invention is not restricted to the embodiment described above and various modifications are available within the scope of this invention. For example, a wire net can be substituted for the metal lid 11 made of a stainless steel plate. Further, it is possible to run continuously both the chain belts 7 supporting the metal cups 8 and the chain belts 10 supporting the metal lids 11, though these chain belts 7 and 10 are run intermittently in the embodiment described.

As described in detail, according to this invention, a fried mass of noodles is received in a cup-shaped container together with proper condiments and ingredients such that the dense portion of the mass of noodles is disposed in the lower portion of the container and the sparse portion of the mass of noodles is disposed in the upper portion of the container. Accordingly the cupped noodles thus produced exhibit a high strength against shocks applied from below the container during transportation and at the storage time. In addition, hot water poured in during the preparation stage rapidly flows downward, leading to a rapid restoration of the fried noodles. Obviously, the method of this invention permits producing instant cupped noodles of a high commercial value at a low cost.

I claim:

1. A method of producing instant cupped noodles, comprising the steps of disposing a mass of noodles in a liquid permeable metal cup having at least one opening for receiving said noodles, said cup having a bottom and an inclined or tapered wall, said wall extending between the top portion and the bottom portion of the cup, the bottom portion of the cup having a smaller cross-sectional area than the top portion of the cup, placing a liquid permeable metal lid to cover said at least one opening of the metal cup, completely immersing the metal cup in an inverted state wherein its bottom portion is up, in a heated oil for frying the mass of noodles housed in the inverted metal cup and retaining the cup in its inverted and completely immersed state during the frying step, to render the mass of noodles dense in the portion thereof close to the bottom portion of the metal cup and sparse in the portion thereof close to the top portion of the metal cup, the dense portion of the fried mass of noodles being substantially more dense than the sparse portion thereof, taking the metal cup out of the heated oil after frying, opening the top larger cross sectional area of the metal cup and discharging the fried mass of noodles from the metal cup, drying the fried mass of noodles discharged from the metal cup, packing the dried mass of noodles in a cup-shaped container substantially equal in shape to and slightly larger in inner diameter than the metal cup, the packing being effected such that the dense and sparse portions of the mass of noodles are disposed in lower and upper portions of the cup-shaped container, respectively, and then sealing the cup-shaped container.

2. The method according to claim 1, comprising packing the dried mass of noodles in the cup-shaped container together with condiments and other ingredients.

3. The method according to claim 2, wherein the condiments and other ingredients are put in the cup-shaped container after the mass of noodles has been put in said cup-shaped container.

4. The method according to claim 3, wherein the bottom of the metal cup and the metal lid are provided with a number of small holes.

5. The method according to claim 1, wherein said at least one opening of said liquid permeable metal cup is at the top portion thereof, and said mass of noodles is disposed in said liquid permeable metal cup through said top opening, further comprising the step of inverting the metal cup after placing said liquid permeable metal lid over said top opening before completely immersing said liquid permeable metal cup in said heated oil for frying.

6. The method according to claim 5, comprising mounting a plurality of said liquid permeable metal cups on a first conveyor means and feeding said metal cups to a means for filling same with noodles, and mounting said metal lids on a second conveyor means which has a portion thereof running adjacent said first conveyor means to close said metal cups with respective metal lids and for conveying said closed metal cups in their inverted state.

7. The method according to claim 6, comprising guiding at least a portion of the adjacent portions of said first and second conveyor means into said heated oil to completely immerse the closed metal cups in their inverted state, in the heated oil for frying the mass of noodles housed in the respective cups, and then guiding said inverted closed cups out of said heated oil.

8. The method according to claim 7, comprising separating said adjacent first and second conveyor means to remove the respective lids from the metal cups to open the metal cups to permit discharging the fried mass of noodles from the respective metal cups, said cups being in their inverted states when said lids are separated therefrom so that said fried mass of noodles falls from the respective cups.

9. The method according to claim 6, comprising locating and first and second conveyor means in respective first and second loops, a portion of said first and second loops being adjacent each other, and moving one of said loops in a clockwise direction and the other of said loops in a counter-clockwise direction, whereby the portions of the loops adjacent each other move in the same direction.

10. The method according to claim 6, wherein said plurality of cups are attached to said first conveyor means, and said plurality of lids are attached to said second conveyor means.

* * * * *

UNITED STATES PATENT AND TRADEMARK OFFICE
CERTIFICATE OF CORRECTION

PATENT NO. : 4,166,139
DATED : August 28, 1979
INVENTOR(S) : Masayuki ISHIDA

It is certified that error appears in the above-identified patent and that said Letters Patent are hereby corrected as shown below:

Column 6 (claim 9), line 29, change "and" (first occurrence) to --said--.

Signed and Sealed this

Fourth Day of December 1979

[SEAL]

Attest:

SIDNEY A. DIAMOND

Attesting Officer    Commissioner of Patents and Trademarks